United States Patent
Kino

[11] Patent Number: 6,115,078
[45] Date of Patent: Sep. 5, 2000

[54] IMAGE SHARPNESS PROCESSING METHOD AND APPARATUS, AND A STORAGE MEDIUM STORING A PROGRAM

[75] Inventor: Masatoshi Kino, Kyoto, Japan

[73] Assignee: Dainippon Screen Mfg. Co., Ltd., Kyoto, Japan

[21] Appl. No.: 08/926,486

[22] Filed: Sep. 10, 1997

[30] Foreign Application Priority Data

Sep. 10, 1996 [JP] Japan ................................. 8-238278

[51] Int. Cl.$^7$ .............................. H04N 1/58; H04N 1/409
[52] U.S. Cl. ...................... 348/625; 348/627; 348/630; 348/252; 382/254; 358/532
[58] Field of Search .................. 348/625, 252, 348/627, 624, 630; 358/532, 523; 382/167, 263, 254, 255, 266, 269; H04N 1/409, 1/56, 1/58

[56] References Cited

U.S. PATENT DOCUMENTS

| | | | |
|---|---|---|---|
| 3,800,077 | 3/1974 | Smith ........................................ | 348/625 |
| 4,237,481 | 12/1980 | Aughton .................................. | 358/532 |
| 4,319,268 | 3/1982 | Yamada .................................. | 358/75 |
| 4,672,463 | 6/1987 | Tomohisa et al. ...................... | 358/447 |
| 4,785,347 | 11/1988 | Ezuka et al. ............................ | 358/532 |
| 4,844,288 | 7/1989 | Cho ......................................... | 358/447 |
| 4,972,256 | 11/1990 | Hirosawa et al. ....................... | 358/532 |
| 5,121,209 | 6/1992 | Smith et al. ............................. | 348/625 |
| 5,287,418 | 2/1994 | Kishida ................................... | 382/169 |
| 5,442,717 | 8/1995 | Murakami ............................... | 382/162 |
| 5,796,873 | 8/1998 | Deane ..................................... | 382/254 |
| 5,825,938 | 10/1998 | De Lange ............................... | 382/263 |
| 5,896,469 | 4/1999 | Murakami ............................... | 382/254 |
| 5,907,667 | 5/1999 | Shiraishi ................................. | 382/254 |

FOREIGN PATENT DOCUMENTS 6-36022  2/1994  Japan .
6-231273 8/1994  Japan .

*Primary Examiner*—John K. Peng
*Assistant Examiner*—Jean W. Désir
*Attorney, Agent, or Firm*—McDermott, Will & Emery

[57] ABSTRACT

A sharpness processing method and apparatus, and a storage medium storing a program, for presenting images with increased perspective or three-dimensional effect. At least two points are designated in a direction of distance on an original image displayed on a display screen. The original image is divided by lines extending perpendicular to and touching opposite ends of a vector defined by the two points. An output image in the proper perspective is obtained by applying no processing to a near view area in the original image, applying a uniformly strong blur processing to a distant view area, and processing an intermediate area in a way to increase blur gradually in the direction indicated by the vector.

13 Claims, 7 Drawing Sheets

IMAGE SHARPNESS PROCESSING METHOD AND APPARATUS, AND A STORAGE MEDIUM STORING A PROGRAM

BACKGROUND OF THE INVENTION (1) Field of the Invention

This invention relates to an image sharpness processing method and apparatus, and a storage medium storing a program, used, for example, in a plate-making process for enhancing or suppressing tone variations in outline portions of an original image.

(2) Description of the Related Art

The principle of sharpness processing will be described with reference to FIG. 1.

Figure 1:
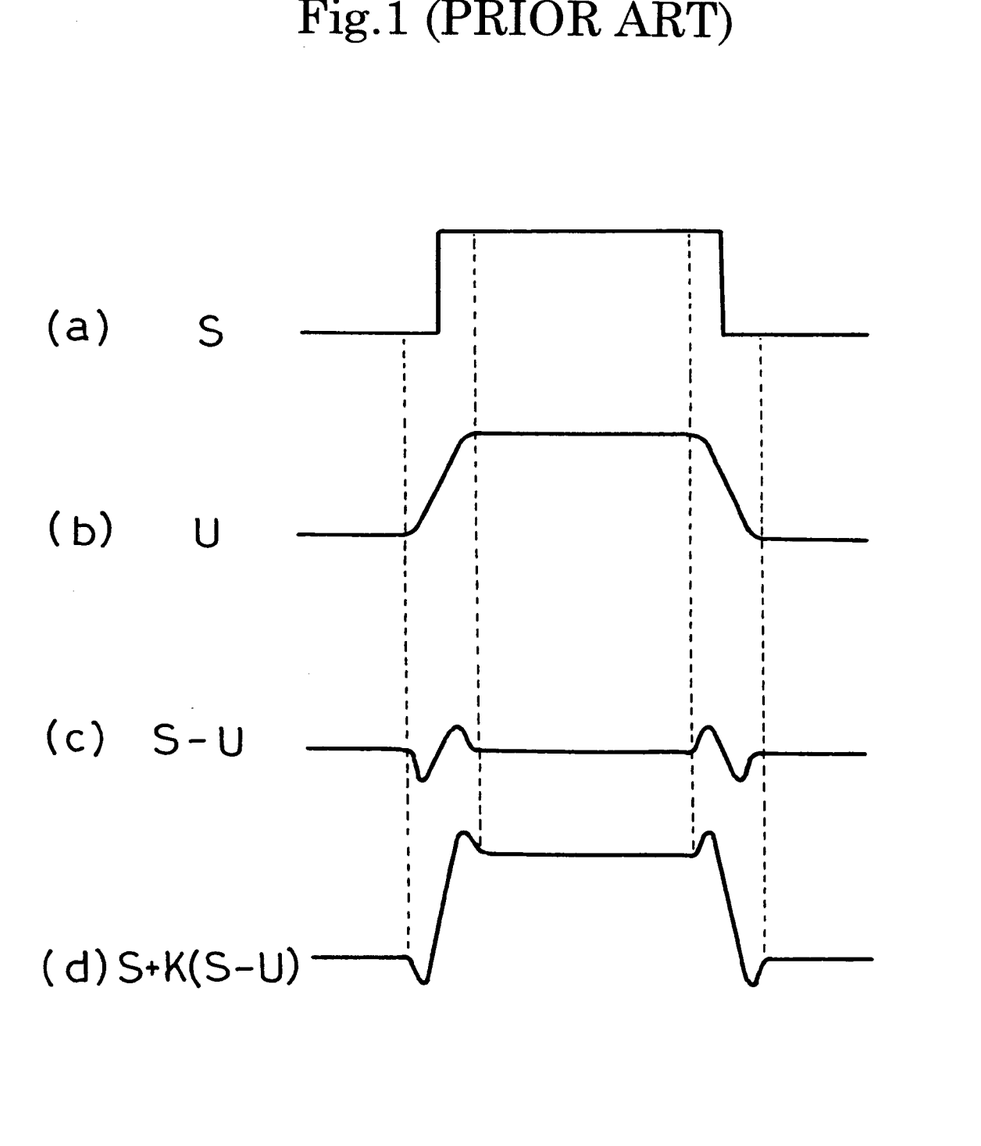
FIG. 1 is an explanatory view of a conventional sharpness processing.

Assume that a particular area of an original image has an image signal S (i.e. an original signal S) as shown in FIG. 1(a). Key pixels in the particular area are successively selected, and an average signal is obtained from color component signals, for example, of 5×5 pixels surrounding each key pixel. This corresponds to an unsharp signal U as shown in FIG. 1(b). Next, the unsharp signal U is subtracted from the original signal S to obtain an unsharp mask signal (S-U) as shown in FIG. 1(c). The unsharp mask signal (S-U) is added to the original signal S to obtain a signal enhancing outline portions as shown in FIG. 1(d). At this time, the unsharp mask signal (S-U) is multiplied by a parameter k to adjust a strength level of processing. An image with enhanced sharpness is obtained if parameter k is larger than zero. However, if $-1<k<0$, the image will be something between the original signal S in FIG. 1(b) and unsharp signal U in FIG. 1(b), i.e. a blurred image.

It has been conventional practice to effect such sharpness processing with uniform strength for an entire original image. The following inconvenience results from sharpness processing effected with uniform strength for an entire original image.

When an object with depths, such as a landscape, is photographed with a camera, near areas in focus appear with clear outlines while distant areas are blurred. Images in the proper perspective are often obtained with a varying degree of blur according to distances of objects.

However, when sharpness is enhanced uniformly for an original image obtained by photographing an object with depths, not only near areas but distant areas appear with clear outlines. This ruins the perspective effect of the original image.

SUMMARY OF THE INVENTION

This invention has been made having regard to the state of the art noted above, and its object is to provide a sharpness processing method and apparatus, and a storage medium storing a program, which are capable of stressing a perspective or three-dimensional effect.

The above object is fulfilled, according to one aspect of this invention, by an image sharpness processing method for enhancing or suppressing tone variations in outline portions of an original image, comprising a processing direction designating step for designating, on the original image displayed on a display screen, at least a direction for gradually changing a strength of sharpness processing as a condition of the sharpness processing; a strength deriving step for deriving a strength of sharpness processing for each pixel in the original image, such that the strength of sharpness processing gradually changes in the direction of sharpness processing designated; and a processing step for applying a sharpness processing to the original image according to the strength of sharpness processing derived for each pixel.

This invention has the following functions.

An original image obtained by photographing an object with depths, for example, is displayed on a display screen. A direction for gradually changing a strength of sharpness processing is designated on the original image to concur with a direction extending between a distant view area and a near view area (i.e. a direction of distance) in the original image. A strength of sharpness processing is determined for each pixel in the original image, such that the strength of sharpness processing gradually changes in that direction. For example, a parameter of sharpness processing is obtained, which will gradually reduce sharpness from the near view area to the distant view area in the original image. When a sharpness processing is applied to the original image under such a processing condition, the image is given enhanced perspective or three-dimensional effect, with distinct outlines in the near view area in the original image, and increasingly blurred outlines toward the distant view area.

Preferably, the processing direction designating step is executed to designate ranges on the original image to be subjected to the sharpness processing as well as the direction for gradually changing a strength of sharpness processing. This method furthers the perspective or three-dimensional effect of the resulting image since ranges best suited for the sharpness processing is designated on the original image along with the direction for gradually changing a strength of sharpness processing.

It is also preferred, according to this invention, that the processing direction designating step is executed to designate at least two arbitrary points on the original image displayed on the display screen, the two arbitrary points defining a vector indicating the direction for gradually changing a strength of sharpness processing, the ranges to be subjected to the sharpness processing being determined by dividing the original image with phantom lines extending perpendicular to and touching opposite ends of the vector, respectively, and the strength deriving step is executed to derive the strength of sharpness processing for each pixel, such that one end area in the original image outside an intermediate area located between the phantom lines is subjected to a sharpness processing of uniformly high strength, the other end area in the original image outside the intermediate area is subjected to a sharpness processing of uniformly low strength, and the intermediate area is subjected to a sharpness processing with a strength gradually changing along the vector from the sharpness processing of uniformly high strength for the one end area to the sharpness processing of uniformly low strength for the other end area.

With this method, the direction for gradually changing the strength of sharpness processing and the ranges to be subjected to the sharpness processing are established by designating at least two arbitrary points on the original image. For example, one point is designated in the near view area of the original image, and the other point in the distant view area thereof. These two points define a vector indicating the direction for gradually changing the strength of sharpness processing. The ranges to be subjected to the sharpness processing are determined by dividing the original image with phantom lines extending perpendicular to and touching the opposite ends of the vector. Specifically, an intermediate area located between the two phantom lines is subjected to a sharpness processing with a strength gradually changing along the vector designated. One end area in the original image outside the intermediate area is subjected to a sharpness processing of uniformly high strength. The other end area is subjected to a sharpness processing of uniformly low strength. As a result, an image in the proper perspective is obtained in which, for example, the near view area has uniformly distinct outlines, the intermediate area is increasingly blurred toward the distant view area, and the distant view area has a uniform, relatively strong blur.

In another aspect of the invention, there is provided an image sharpness processing apparatus suitable for executing the foregoing method. That is, an image sharpness processing apparatus for enhancing or suppressing tone variations in outline portions of an original image, according to this invention, comprises an original image data storage for storing image data of each pixel in the original image; an image display for displaying images; a processing direction designating device for causing the original image read from the original image data storage to be displayed on the image display, and designating, on the original image displayed on the image display, at least a direction for gradually changing a strength of sharpness processing; a strength deriving device for deriving a strength of sharpness processing for each pixel in the original image, such that the strength of sharpness processing gradually changes in the direction of sharpness processing designated; and a processor for applying a sharpness processing to the original image according to the strength of sharpness processing derived for each pixel.

According to the above apparatus, the processing direction designating device is operated to designate a direction for gradually changing a strength of sharpness processing on the original image displayed on the images display, to concur with a direction of distance in the original image, for example. The strength deriving device derives a strength of sharpness processing for each pixel in the original image, such that the strength of sharpness processing gradually changes in the direction designated. The processor applies a sharpness processing to the original image based on the strength of sharpness processing for each pixel. As a result, an image is obtained in which the strength of sharpness processing changes in the direction of distance in the original image.

Preferably, the processing direction designating device comprises a pointing device for designating at least two arbitrary points on the original image displayed on the image display. With this construction, the pointing device such as a mouse may be used to designate one point in the near view area and the other point in the distant view area on the original image displayed on the image display.

This invention also provides a storage medium storing a program for causing a computer to execute the foregoing method.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED
EMBODIMENTS

A preferred embodiment of the present invention will be described in detail hereinafter with reference to the drawings.

Figure 2:
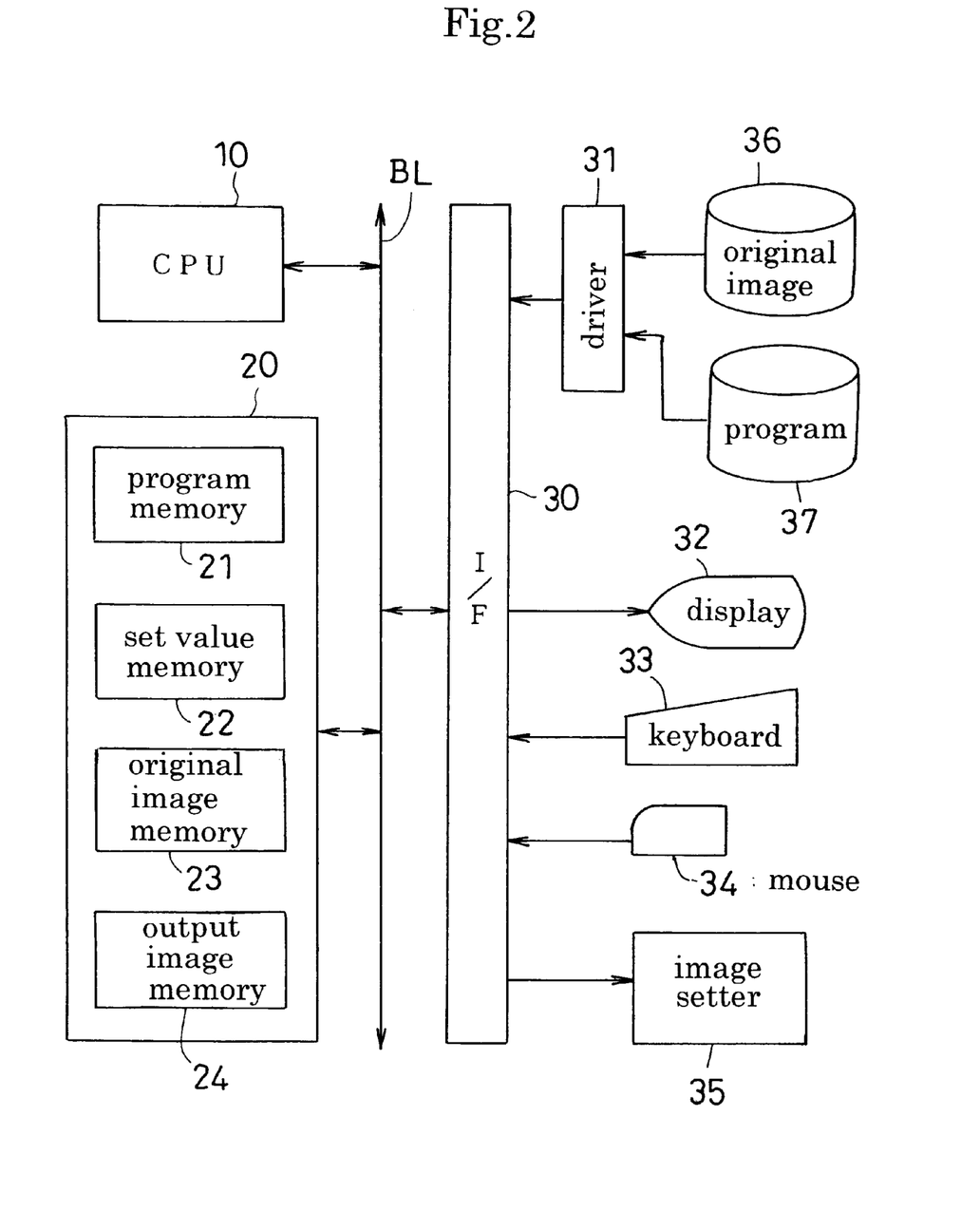
FIG. 2 is a block diagram of a sharpness processing apparatus according to this invention.

FIG. 2 is a block diagram of an image sharpness processing apparatus according to this invention.

The image sharpness processing apparatus in this embodiment is composed of a computer system. A CPU 10 for executing a sharpness processing of an original image is connected through a busline BL to an internal memory 20 in the form of RAM. The internal memory 20 includes discrete regions acting as a program memory 21 into which a program is loaded for executing the sharpness processing, a set value memory 22 for storing various conditions of the sharpness processing, an original image memory 23 for storing original image data, and an output image memory 24 for storing image data resulting from the sharpness processing. CPU 10 is connected to an external storage driver 31, a display 32, a keyboard 33, a mouse 34 and an image setter 35 through an I/O interface 30.

The external storage driver 31 receives an external storage 36 storing original image data, and an external storage 37 storing a sharpness processing program. The external storages 36 and 37 may be in the form of magnet-optical disks, CD-ROMs, floppy disks or magnetic tapes. The original image data read from the external storage 36 is stored in the original image memory 23. The processing program read from the external storage 37 is stored in the program memory 21.

The display 32 displays the original image stored in the original image memory 23, and an input screen for setting various conditions of the sharpness processing. The keyboard 33 and mouse 34 are used to designate at least two points on the original image appearing on the display 32 and to input various conditions of the sharpness processing. The display 32 is used also to display a processed image stored in the output image memory 24, for confirmation of the effect of sharpness processing.

The image setter 35 is in the form of a recording scanner, for example, for printing the processed image stored in the output image memory 24, on a plate or film with high precision.

In the above embodiment, the original image memory 23 corresponds to the original image data storage of this invention. The display 32 corresponds to the image display. The mouse 34 corresponds to the pointing device which is one example of processing direction designating device. CPU 10 corresponds to the strength deriving devices and the processor. The external memory 37 corresponds to the storage medium storing the program in this invention.

Figure 3:
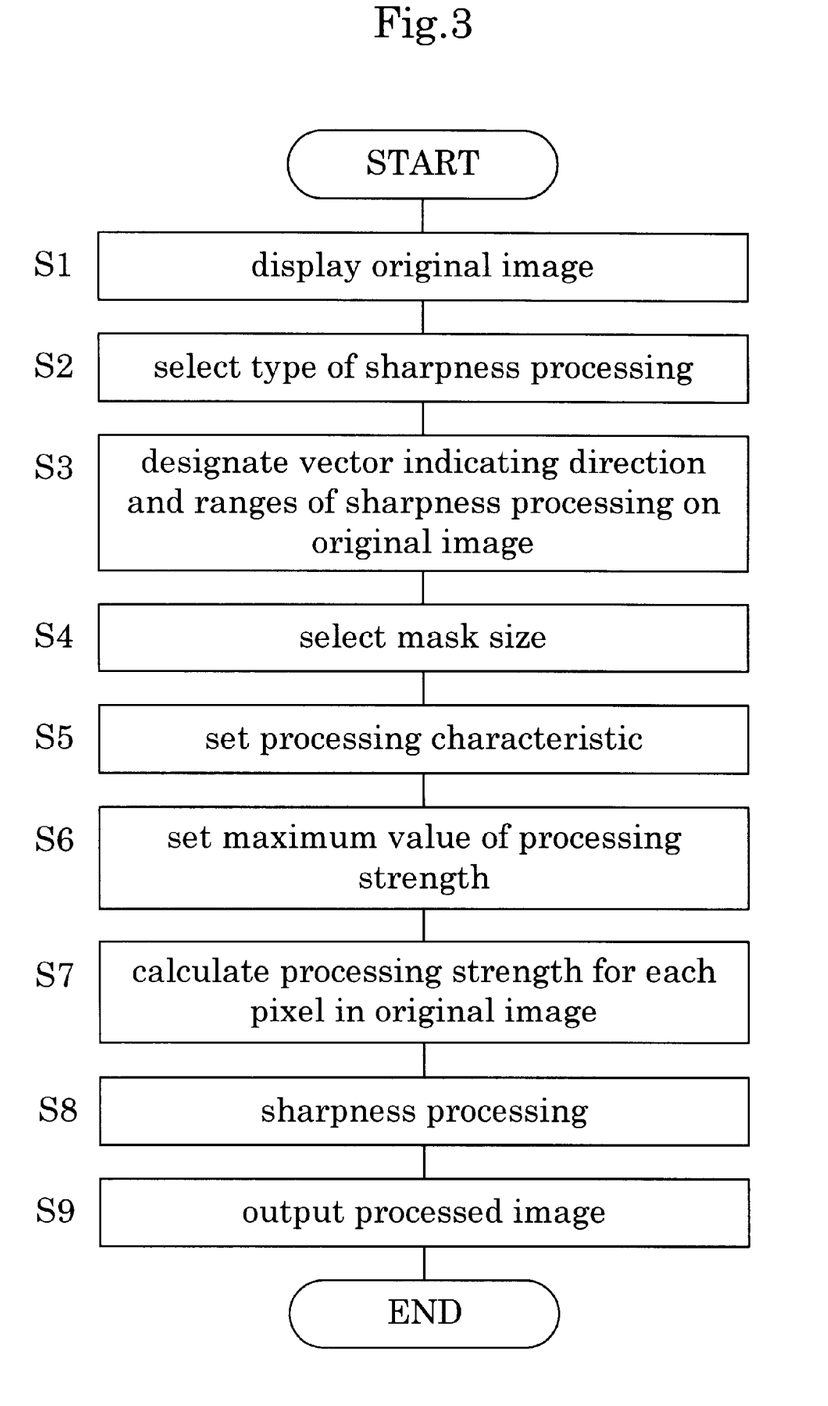
FIG. 3 is a flowchart of a processing sequence according to this invention.

An operation of the apparatus in the above embodiment will be described with reference to the flowchart shown in FIG. 3.

Step S1: The processing program is loaded from the external storage 37 into the program memory 21. Then, data of an original image to be processed are loaded from the external storage 36 into the original image memory 23. In this embodiment, the three primary components of red (R), green (G) and blue (B) are taken in as the original image data. The original image is displayed on the display 32.

Step S2: A type of sharpness processing is selected from the condition setting screen shown in a window on the display 32. The types of sharpness processing include "Sharpen" for enhancing sharpness of outlines in original images, and "Blur (Smoothing)" for blurring the outlines. The operator may select one of the two types.

Step S3: A vector is designated on the original image displayed on the display 32 to indicate a direction and ranges of sharpness processing. This step will particularly be described with reference to FIG. 5.

Figure 5:
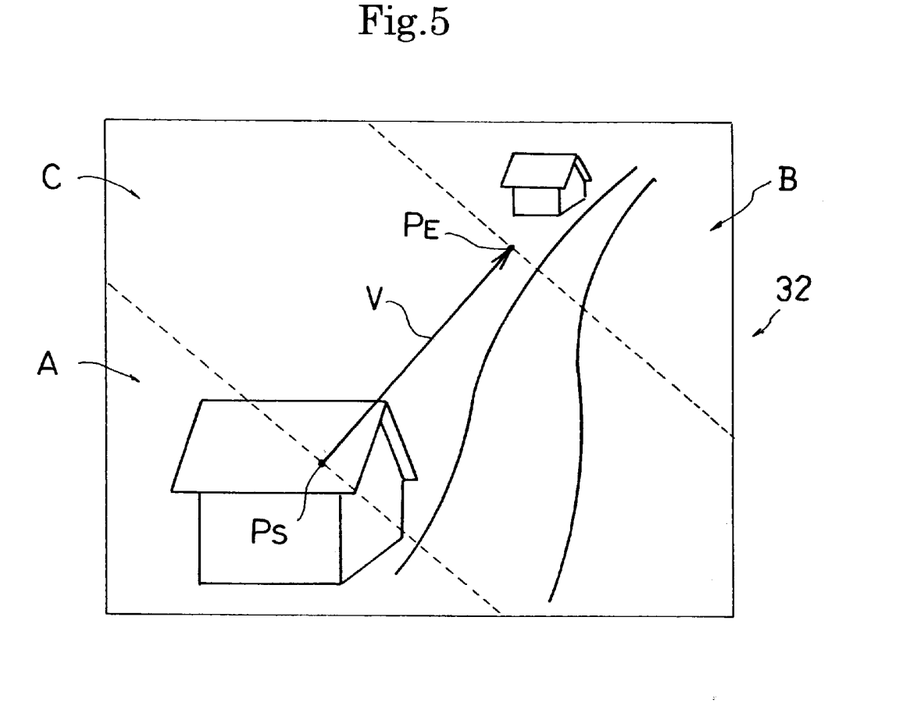
FIG. 5 is a view showing a way of designating a direction and ranges of sharpness processing on an original image.

FIG. 5 shows one example of original image appearing on the display 32. This original image includes a near view area A, a distant view area B and an intermediate area C. It is assumed here that the operator intends to improve a perspective effect by blurring the distant view area B in the original image. In this case, the operator selects "Blur" at step S2. At step S3, the operator marks at least two points $P_S$ and $P_E$ in the original image with the mouse 34. Point $P_S$ is set to or adjacent a boundary between the near view area A not to be blurred and the intermediate area C to be blurred gradually. Point $P_E$ is set to a boundary between the intermediate area C and distant view area B, and spaced from point $P_S$ in a direction in which the level of blur is to be varied gradually, i.e. the direction from foreground to background in the original image.

The vector V between the two points $P_S$ and $P_E$ designated as above indicates a direction for gradually changing the strength of sharpness processing. Further, the positions of points $P_S$ and $P_E$ determine ranges to undergo sharpness processing. The apparatus is programmed to establish ranges to undergo sharpness processing, as described hereinafter with reference to FIG. 6. CPU 10, in the course of processing, determines phantom lines $K_S$ and $K_E$ extending perpendicular to and touching the opposite ends of vector V, respectively, and divides the original image with the phantom lines $K_S$ and $K_E$ to determine ranges to undergo sharpness processing. That is, sharpness processing (i.e. blurring in this example) is not applied to one end area (near view area) A divided from the rest of the original image by phantom line $K_S$. The other end area (distant view area) B in the original image divided by phantom line $K_E$ is to be subjected to sharpness processing (i.e. blurring in this example) with maximum strength. For the intermediate area C between phantom lines $K_S$ and $K_E$, a strength of sharpness processing is determined for each pixel so that the strength of sharpness processing (the degree of blur) increases gradually in the direction indicated by vector V. Details of a process for deriving a strength of sharpness processing for each pixel will be described hereinafter.

Step S4: A mask size is selected for use in producing an unsharp mask signal (see FIG. 1(b)) in time of sharpness processing. In this embodiment, a mask of 3×3 pixels, a mask of 5×5 pixels and a mask 7×7 pixels are made available. The small mask is selected when emphasizing details in the original image, and the large mask is selected in the opposite case.

Step S5: A processing characteristic is set to the sharpness processing. This aspect will be described with reference to FIG. 7 which is a schematic view showing processing characteristics of the sharpness processing. The horizontal axis represents positions on vector V shown in FIGS. 5 and 6. The vertical axis represents strengths of sharpness processing corresponding to the respective positions. Processing strength N is standardized, which is "0" (non-processing) at the starting point $P_S$ of vector V, and "1" (maximum strength) at the terminal point $P_E$ of vector V. At step S5, the operator designates processing strength $N_M$ for point $P_M$ corresponding to an intermediate position on vector V. Once the processing strength for the intermediate position is designated, CPU 10 automatically sets a smooth conversion characteristic (e.g. a square function) extending through point $(P_M, N_M)$.

Step S6: A maximum value K of sharpness processing strength is set. A strength of sharpness processing is set with a numerical value for the maximum strength "1" in the standardized conversion characteristic shown in FIG. 7. Therefore, strength (parameter) F of sharpness processing for each position on vector V is expressed by a product of standardized processing strength N determined by the conversion characteristic of FIG. 7 and maximum value K of processing strength designated at step S6 (F=K·N).

The processing conditions set at steps S2–S6 above are stored in the set value memory 22.

Figure 4:
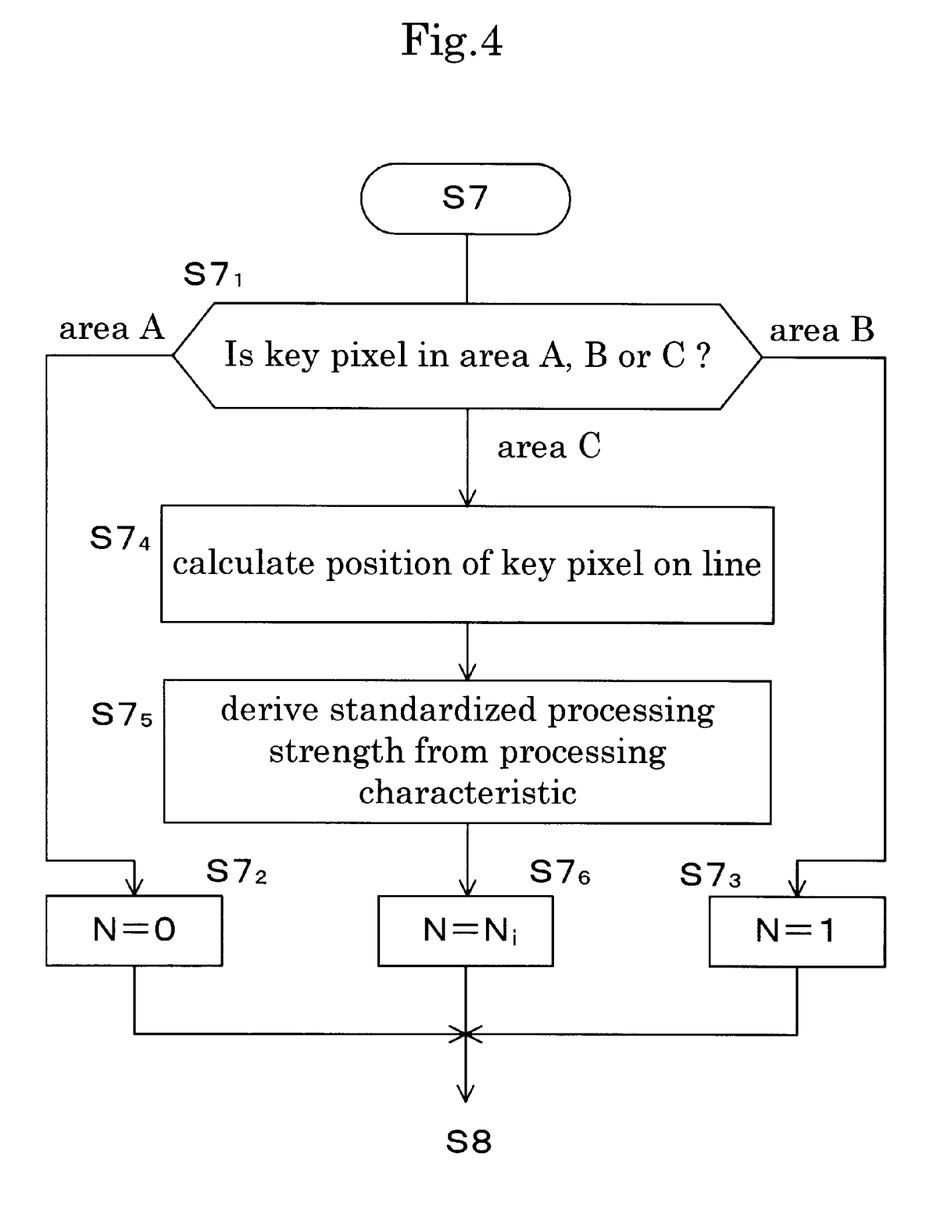
FIG. 4 is a flowchart of a sequence of computing a processing strength for each pixel.

Step S7: A strength of sharpness processing is calculated for each pixel in the original image based on the conditions of sharpness processing designated through the operations up to step S6. The operation carried out at step S7 will be described with reference to the flowchart shown in FIG. 4.

Figure 6:
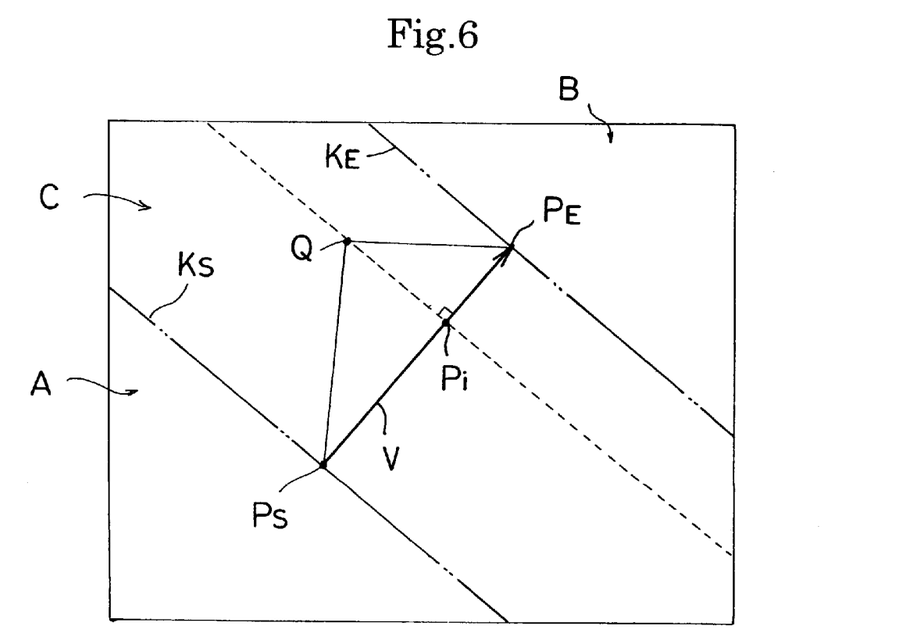
FIG. 6 is an explanatory view of an operation.
Figure 7:
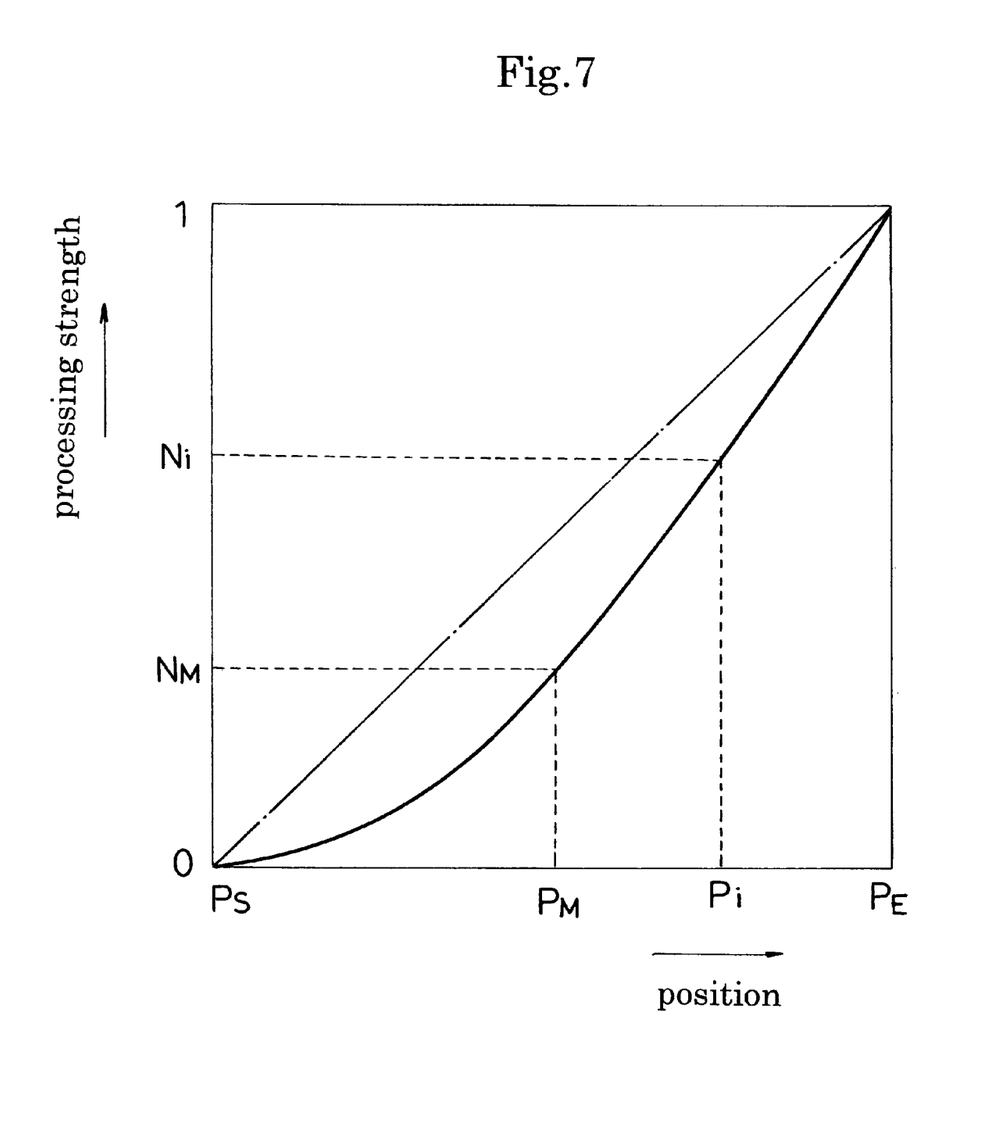
FIG. 7 is a graph showing conversion characteristics.

Key pixels are successively set in the original image, and each key pixel is checked for its location in which of the areas A, B and C divided by the phantom lines $K_S$ and $K_E$ shown in FIG. 6 (step $S7_1$). If the key pixel belongs to area A in FIG. 6, "0" is set to this key pixel as standardized processing strength N (step $S7_2$). If the key pixel belongs to area B in FIG. 6, "1" is set to this key pixel as standardized processing strength N (step $S7_3$).

On the other hand, if the key pixel belongs to area C in FIG. 6, to which position on vector V in FIG. 6 this key pixel corresponds is determined. Specifically, as shown in FIG. 6, the position of intersection Pi of vector V and a line extending perpendicular thereto from point Q belonging to area C is determined (step $S7_4$). The position of intersection Pi can be determined geometrically and easily since the positions of designated two points $P_S$ and $P_E$ and the position of key pixel Q are all known. Once the position of intersection Pi is determined, standardized processing strength Ni for key pixel Q is derived from the processing characteristic shown in FIG. 7 (step $S7_5$). It will be clear from the above description that the same processing strength is set to each point on a line extending perpendicular to vector Y, and that the processing strength increases from starting point $P_S$ toward terminal point $P_E$.

Step S8: Once standardized processing strength N is determined for each pixel in the original image, each pixel is subjected to sharpness processing based on the following equations:

$$rij = Rij \pm K \cdot N \,(S-U) \quad (1)$$

$$gij = Gij \pm K \cdot N \,(S-U) \quad (2)$$

$$bij = Bij \pm K \cdot N \,(S-U) \quad (3)$$

In equations (1)–(3), rij, gij and bij are RGB components of the pixels having undergone the sharpness processing, Rij, Gij and Bij are RGB components of the pixels in the original image, and S is a gray component of the pixels in the original image. The gray component is obtained, for example, by averaging the color components of each pixel (S=(Rij+Gij+Bij)/3). U is an unsharp signal of gray component S of the original image, which is obtained by using the mask size set at step S4. The sign "±" in equations (1)–(3) is determined according to the type of sharpness processing set at step S2. The sign "+" is set when "Sharpen" is selected, and the sign "−" is set when "Blur" is selected. K is the maximum value of processing strength set at step S6. N is the standardized processing strength for each pixel in the original image obtained at step S7.

Step S9: When the sharpness processing has been executed for each pixel in the original image, resulting image data is stored in the output image memory 24. and is outputted to the image setter 35 as necessary. Since "Blur" is selected in this example, an image is produced in which the near view area A in FIG. 5 has clear outlines, the intermediate area C is blurred gradually in the direction indicated by vector V, and the distant view area B is blurred intensely.

Figure 8:
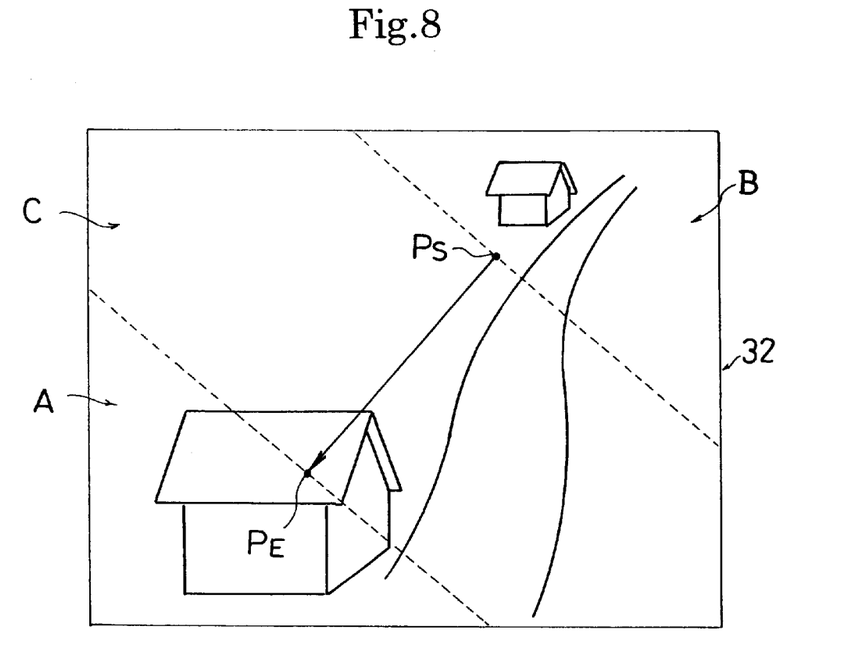
FIG. 8 is a view showing another way of designating a direction and ranges of sharpness processing on the original image.

This invention is not limited to the foregoing embodiment but may be modified as follows:

(1) As shown in FIG. 8, a starting point $P_S$ may be designated in the distant view area B and a terminal point $P_E$ in the near view area A, with "Sharpen" selected as the type of sharpness processing. With this setting, a sharpness enhancement processing is not applied to the distant view area B, the intermediate area C undergoes a sharpness enhancement gradually intensifying in the direction indicated by vector V (from starting point $P_S$ to terminal point $P_E$), and the near view area A undergoes a strong sharpness enhancement. Thus, an image in the proper perspective is obtained as in the foregoing embodiment.

Figure 9:
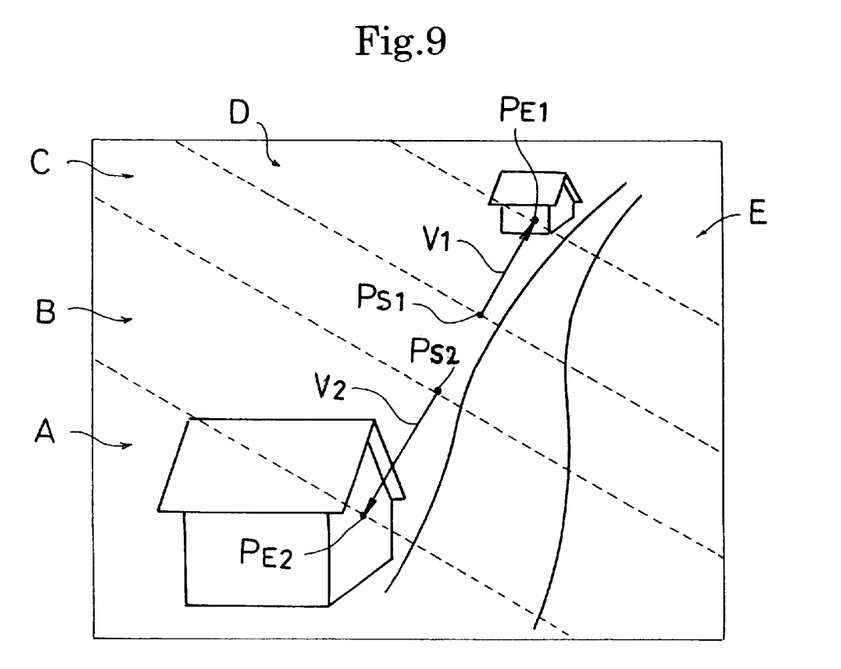
FIG. 9 is a view showing yet another way of designating a direction and ranges of sharpness processing on the original image.

(2) In the foregoing embodiment, a direction for gradually changing the strength of sharpness processing, and ranges to undergo the sharpeness processing, are established by designating two points on the original image. A direction and ranges of sharpness processing may be established by designating three or more points. As shown in FIG. 9, for example, "Blur" is selected first, and a vector $V_1$ is established adjacent the distant view area by designating a starting point $P_{S1}$ and a terminal point $P_{E1}$. Then, "Sharpen" is selected, and a vector $V_2$ is established adjacent the near view area by designating a starting point $P_{S2}$ and a terminal $P_{E2}$. In this case, a first processing strength for each pixel in the original image is determined based on the pair of designated points $P_{S1}$ and $P_{E1}$, and then a second processing strength for each pixel in the original image is determined based on the other pair of designated points $P_{S2}$ and $P_{E2}$. Subsequently, an average of the first and second processing strengths is determined for each pixel in the original image. A sharpness processing is applied to the original image based on the average strengths derived. As a result, in the example shown in FIG. 9, area C undergoes no sharpness processing, area B undergoes a sharpness enhancement processing gradually intensifying in the direction indicated by vector $V_2$, and area A undergoes a sharpness enhancement processing of uniform strength. As for area D, the strength of blurring increases gradually in the direction indicated by vector $V_1$. Area E undergoes a blur processing of uniform strength.

(3) In the foregoing embodiment, a direction and ranges of sharpness processing are established. However, only a direction of sharpness processing may be established by designating two points on the original image. In this case, the strength of sharpness processing may change uniformly in the direction indicated by the vector determined by the two designated points.

(4) In the foregoing embodiment, the gray component of the original image is extracted, and an unsharp signal is derived from the gray component. A sharpness processing is applied to each of the RGB components by using the unsharp signal. Alternatively, an unsharp signal may be derived from each of the RGB components of the original image to apply a sharpness processing to each color component.

(5) This invention is not limited to the sharpness processing of the RGB color components. The invention may be used to apply a sharpness processing to each color component of yellow (Y), magenta (M), cyan (C) and black (K) of the original image.

The present invention may be embodied in other specific forms without departing from the spirit or essential attributes thereof and, accordingly, reference should be made to the appended claims, rather than to the foregoing specification, as indicating the scope of the invention.

What is claimed is:

1. An image sharpness processing method for enhancing or suppressing tone variations in outline portions of an original image, comprising:

a processing direction designating step for designating, on said original image displayed on a display screen, at least a direction for gradually changing a strength of sharpness processing as a condition of the sharpness processing;

a strength deriving step for deriving a strength of sharpness processing for each pixel in said original image, such that the strength of sharpness processing gradually changes in said direction of sharpness processing designated; and a processing step for applying a sharpness processing to said original image according to said strength of sharpness processing derived for each pixel.

2. A method as defined in claim 1, wherein said processing direction designating step is executed to designate ranges on said original image to be subjected to the sharpness processing as well as said direction for gradually changing a strength of sharpness processing.

3. A method as defined in claim 2, wherein:

said processing direction designating step is executed to designate at least two arbitrary points on said original image displayed on said display screen, said two arbitrary points defining a vector indicating said direction for gradually changing the strength of sharpness processing, said ranges to be subjected to the sharpness processing being determined by dividing said original image with phantom lines extending perpendicular to and touching opposite ends of said vector, respectively, and said strength deriving step is executed to derive the strength of sharpness processing for each pixel, such that one end area in said original image outside an intermediate area located between said phantom lines is subjected to a sharpness processing of uniformly high strength, the other end area in said original image outside said intermediate area is subjected to a sharpness processing of uniformly low strength, and said intermediate area is subjected to a sharpness processing with a strength gradually changing along said vector from said sharpness processing of uniformly high strength for said one end area to said sharpness processing of uniformly low strength for said other end area.

4. A method as defined in claim 3, wherein said strength deriving step is executed to determine a strength of sharpness processing for each pixel belonging to said intermediate area, such that all pixels on each line extending perpendicular to said vector are subjected to a sharpness processing of equal strength.

5. A method as defined in claim 4, further comprising a processing characteristic designating step for designating a processing characteristic for determining a mode of strength variation in the sharpness processing of said intermediate area, said processing characteristic being expressed by a strength of sharpness processing associated with each position on said vector designated.

6. A method as defined in claim 5, wherein said processing characteristic designating step is executed to designate a characteristic of sharpness processing according to a strength of sharpness processing for an intermediate position on said vector.

7. A method as defined in claim 6, wherein said characteristic of sharpness processing is designated by a standardized strength of sharpness processing, where "1" represents a maximum strength and "0" represents a minimum strength,
   said method further comprising a maximum value designating step for designating a maximum value of strength of sharpness processing,
   said strength deriving step being executed to determine said strength of sharpness processing for each pixel by multiplying a standardized strength for each pixel determined by said characteristic of sharpness processing, by said maximum value designated.

8. A method as defined in claim 1, further comprising a processing type designating step for designating, as a type of sharpness processing, one of a sharpness enhancement processing for enhancing outlines in said original image and a blur processing for blurring the outlines in said original image.

9. A method as defined in claim 1, wherein said processing step includes:
   a step of successively setting key pixels in said original image, and obtaining an unsharp signal of each key pixel by averaging components of a plurality of pixels surrounding each key pixel;
   a step of obtaining an unsharp mask signal of each key pixel by subtracting said unsharp signal of each key pixel from components of each key pixel; and
   a step of obtaining a sharpness-processed image by multiplying said unsharp mask signal of each key pixel by a constant relating to a strength of sharpness processing, and adding or subtracting a product thereof to/from said components of each key pixel in said original image.

10. A method as defined in claim 9, wherein said step of obtaining said unsharp signal uses an image processing mask for obtaining a mean signal of said plurality of pixels surrounding each key pixel;
    said method further comprising a mask size designating step for designating one of different size masks prepared in advance, to determine said plurality of pixels surrounding each key pixel.

11. An image sharpness processing apparatus for enhancing or suppressing tone variations in outline portions of an original image, comprising:

original image data storage means for storing image data of each pixel in said original image;

image display means for displaying images;

processing direction designating means for causing said original image read from said original image data storage means to be displayed on said image display means, and designating, on said original image displayed on said image display means, at least a direction for gradually changing a strength of sharpness processing;

strength deriving means for deriving a strength of sharpness processing for each pixel in said original image, such that the strength of sharpness processing gradually changes in said direction of sharpness processing designated; and processing means for applying a sharpness processing to said original image according to said strength of sharpness processing derived for each pixel.

12. An apparatus as defined in claim 11, wherein:

said processing direction designating means comprises a pointing device for designating at least two arbitrary points on said original image displayed on said image display means; and said strength deriving means is operable to divide said original image with phantom lines extending perpendicular to and touching opposite ends of a vector defined by said two arbitrary points, and to derive the strength of sharpness processing for each pixel, such that one end area in said original image outside an intermediate area located between said phantom lines is subjected to a sharpness processing of uniformly high strength, the other end area in said original image outside said intermediate area is subjected to a sharpness processing of uniformly low strength, and said intermediate area is subjected to a sharpness processing with a strength gradually changing along said vector from said sharpness processing of uniformly high strength for said one end area to said sharpness processing of uniformly low strength for said other end area.

13. A storage medium storing a program for causing a computer to execute an image sharpness processing for enhancing or suppressing tone variations in outline portions of an original image, said storage medium storing a program for causing a computer to execute:

a processing direction designating step for designating, on said original image displayed on a display screen, at least a direction for gradually changing a strength of sharpness processing;

a strength deriving step for deriving a strength of sharpness processing for each pixel in said original image, such that the strength of sharpness processing gradually changes in said direction of sharpness processing designated; and a processing step for applying a sharpness processing to said original image according to said strength of sharpness processing derived for each pixel.

* * * * *